United States Patent Office 3,477,700
Patented Nov. 11, 1969

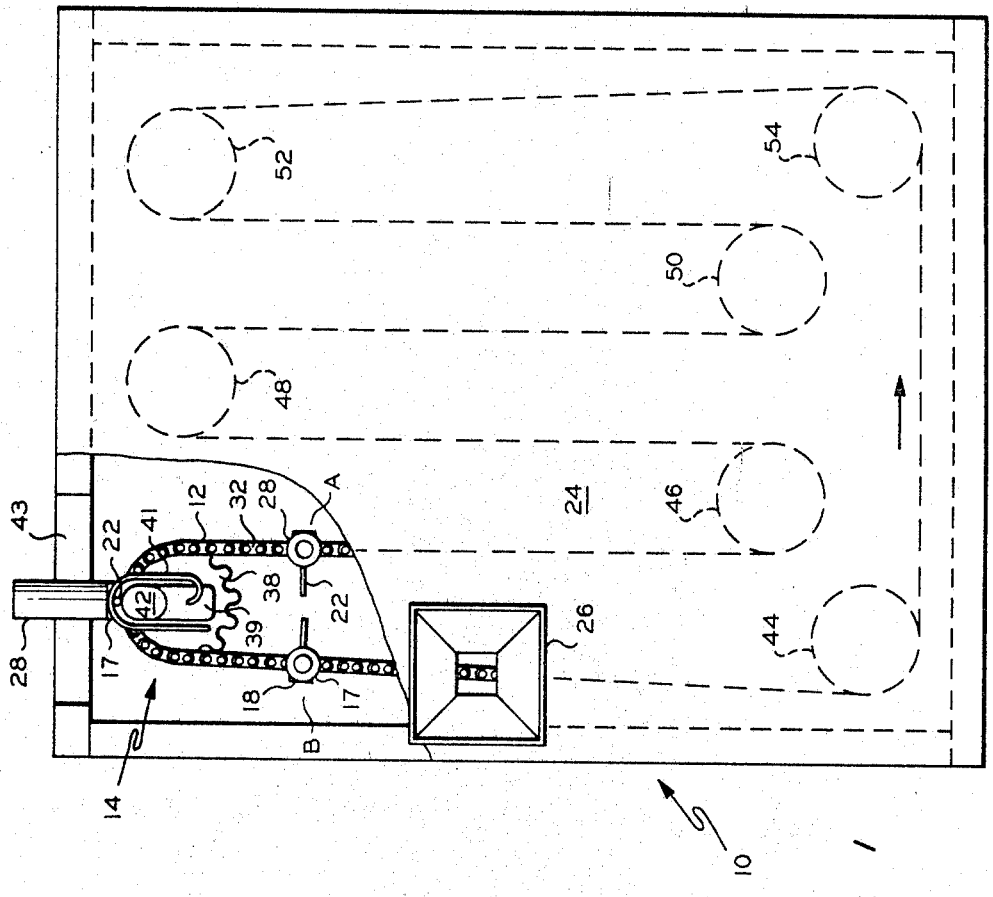
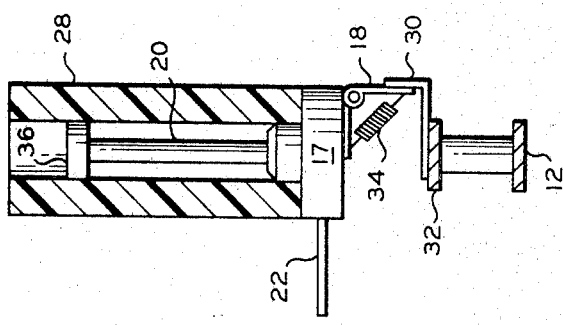

3,477,700
PARISON HEATING AND TRANSFER
William G. Kinslow, Jr., Kansas City, Mo., assignor to Phillips Petroleum Company, a corporation of Delaware
Filed Jan. 8, 1968, Ser. No. 696,329
Int. Cl. F27b *9/24;* F27d *3/12*
U.S. Cl. 263—8
9 Claims

ABSTRACT OF THE DISCLOSURE

Preformed hollow parisons are received on vertically disposed pins attached to an endless chain which conveys these parisons through a heating oven. After the parisons have traveled through the oven and been heated to the desired temperature, the pins are rotated 90° so as to transfer the parisons to a horizontal position. These horizontally disposed parisons are then ready to be received by a molding station. A preferred apparatus for accomplishing the transfer of the parisons from a vertical to a horizontal position comprises a support base to which the support pins are fixedly attached, this base being hinged at one end to a flange extending upwardly from a link plate on the chain; a cam follower fixedly attached to the other end of this base; and a stationary cam plate. The support base is biased so as to support the support pin in a vertical position by a spring or spring clip; as the chain advances the cam follower contacts the stationary cam plate; this cam follower riding against the cam plate causes the support base to pivot about the hinge so as to rotate the support pin from a vertical to a horizontal position, and then as the cam follower passes the high point on the cam plate the base is rotated back so as to return the support pin to a vertical position.

BACKGROUND OF THE INVENTION

This invention relates to a process and apparatus for heating a preformed hollow parison and transferring said parison to position for being received by a molding station.

While the blow molding art goes back over 100 years, it has only been in the last ten years that the blow molding of hollow plastic articles has achieved significant commercial success. With this expanded utilization of blow molding techniques has come progressively more rigorous requirements from the purchasers of the finished product with regard to the appearance, durability, chemical resistance, low cost, and the like of the product.

It is a well-known fact that many polymers which are particularly suitable for blow molding such as the olefin polymers, undergo the phenomenon known as orientation when stretched in the solid state at a temperature below the crystalline melt point. Since this orientation can result in as much as a 20-fold increase in tensile strength, it was only natural that attempts should be made to utilize this phenomenon in the production of blow molded hollow articles such as bottles. Since the greatest orientation occurs at a temperature just below the crystalline melt point while the polymer is on a heating cycle, it was early recognized that little orientation could be effected in a conventional blow molding operation wherein a molten parison was extruded between mold halves and blown; first the temperature of the parison could not be controlled close enough, and second the slight orientation achieved was predominantly in the circumferential direction since at best only a minor amount of stretching in the longitudinal direction occurred. One method of achieving the desired product is to extrude or mold a hollow parison preform, cool it to room temperature, carefully reheat it to just below its crystalline melt point, and then transfer it to a molding station where it is grasped at both ends, stretched longitudinally, thus imparting orientation in a longitudinal direction, and thereafter placed quickly in a mold and expanded to conform to the shape of the mold by the introduction of fluid pressure into the interior of the parison, thus stretching it circumferentially to impart orientation in a second direction. Such a procedure achieves a product of exceptional strength, and surprisingly, in the case of materials such as polypropylene, greatly improved optical properties.

However, since the optimum temperature for orientation is that just below the crystalline melt point of the material comprising the thermoplastic parison, it is apparent that special care must be taken in heating and in transferring the parison to the molding station so as to achieve uniform heating of the parison and so as to transfer parison which is at a temperature just below its crystalline melt point, without in any way damaging it. A simple and economical method of heating hollow parisons would be simply to pass the parisons through a circulating air oven. However, since the parisons are going to be heated to a temperature just below their crystalline melt point there is a problem of distortion of the parisons during this heating step if they are not handled carefully. By placing the parisons around vertically disposed supporting pins they can be moved through the heating oven and uniformly heated without distortion due to sagging. In many instances, however, for instance where the blowing station is horizontally disposed, or in instances where the blowing station is vertically disposed but the parison is moved into position in the blowing station by grasping it while in the horizontal position and rotating it 90°, it is necessary that the parison be received from the heating zone in a horizontal position.

SUMMARY OF THE INVENTION

It is an object of this invention to provide for heating a preformed hollow parison while in a vertically disposed position and thereafter to transfer said parison to a horizontal position preparatory to being received by a molding station. It is a further object of this invention to provide for heating a preformed hollow parison in an air oven to a temperature just below its crystalline melting point and thereafter transferring said parison into position for being received by a molding station, without damaging said parison.

In accordance with this invention an endless chain is positioned within a heating oven, said chain having vertically disposed support pins affixed thereto. Preformed hollow parisons are loaded onto these vertically disposed pins and conveyed through the oven to heat said parisons to a temperature of 1 to 50° below the crystalline melt point of the thermoplastic material comprising the parison. The pins are then rotated 90° to transfer the heated parisons to a horizontal position for delivery to a molding station.

BRIEF DESCRIPTION OF THE DRAWINGS

FIGURE 1 is a plan view with portions broken away showing the preferred embodiment of the heating oven and parison transfer mechanism; and FIGURE 2 is a view partially in section of a support base carrying a parison.

DESCRIPTION OF THE PREFERRED EMBODIMENTS

The novel heating oven and parison transfer mechanism of the instant invention can be used in the heating of hollow thermoplastic parison preforms made, for instance, of any orientable thermoplastic materials such as polymers of at least one 1-olefin, said 1-olefin having 2 to 8 carbon atoms per molecule, poly(vinyl chloride) and the like. It is especially useful in the heating of parisons made of polymers of 1-olefins selected from the group consisting of ethylene, propylene, butene and mixtures thereof, more particularly polypropylene.

These polymers can be formed into hollow parison preforms and cooled to a temperature below their crystalline freezing point. These hollow parison preforms in the solid state are then heated to a temperature of about 1 to about 50 degrees below their crystalline melting point in an oven while disposed in a vertical position and thereafter transferred to a horizontal position preparatory to delivery to a molding station. At this molding station these parisons are generally stretched longitudinally to impart longitudinal orientation; they are then caused to expand to conform to the shape of a mold by the application of a pressure differential between the interior of the parison and the mold wall thus imparting circumferential orientation to give a biaxially oriented product. This orientation process imparts as much as a 20-fold increase in tensile strength to the plastic material.

The crystalline melt point can be determined by heating a small piece of the plastic under a polarizing microscope. The specimen is heated slowly and the temperature at which birefringence disappears is the crystalline melt point.

While the polymer at the temperature for achieving maximum orientation still contains a certain amount of crystallinity and thus has the general physical appearance of solid polymer as opposed to being in a fluid, easily moldable, condition, it is apparent that, at a temperature of 1 to 50 degrees below the crystalline melt point, a considerable amount of the crystallinity has disappeared and the parison cannot be subjected to rough handling.

The preformed hollow parison can be formed initially with one closed end and one open end and the open end placed over the supporting pins in the heating oven, or the parison preforms at this stage can simply be sections of pipe or tubing which are open at both ends and which are clamped or pinched off at one end after delivery to the molding station.

By the term "molding station" as used throughout the specification and claims is meant either a single station where the heated parison is introduced into a mold and expanded by means of differential fluid pressure or a two or three stage molding station wherein the parison is first stretched longitudinally to impart longitudinal orientation and then introduced into a mold and caused to conform to the shape of the mold by introduction of fluid pressure into the interior of the parison.

The oven will generally be of the circulating air type with blowers to circulate the air vigorously. Thermostats capable of controlling the temperature within plus or minus 3 degrees F., preferably within plus or minus 1 degree F., are used since hot spots and wide temperature fluctuation cannot be tolerated when it is desired, as here, to heat the polymer to just below its crystalline melt temperature. Other heating means such as radiant heaters can also be employed.

Referring now to FIGURE 1 there is shown a heated air oven 10 with the top portion partially cut away so as to show the endless chain 12 and the parison transfer station 14. Spaced along this endless chain are support bases 17 made of heat resistant plastic. Each support base is attached to a link plate of said chain by means of hinge 18. Upstanding from said support base is vertically disposed support pin 20. Projecting inwardly from said support base is cam follower 22. Affixed atop top wall 24 of oven 10 is parison loading mechanism 26 which is simply a funnel in this embodiment. As endless chain 12 is incrementally advanced forward as shown by the arrow, a support base 17 is positioned under parison insertion mechanism 26, and a parison is dropped into place over vertically disposed support pin 20. At the same time an identical support base carrying parison 28 is moved from under said parison insertion mechanism, and another identical support base 17 is rotated about hinge 18 so as to transfer parison 28 to a horizontal position for delivery from the heating zone to a molding station.

Reefrring now to FIGURES 1 and 2, support base 17 is hinged to flange 30 which is attached to chain link plate 32. FIGURE 2 shows a support base 17 carrying a parison 28 in a vertical position and thus reflects the position of these elements as they approach the parison transfer station 14, this position being designated by the character A in FIGURE 1. Base 17 is biased in a horizontal plane, so as to position support pin 20 in a vertical position, by spring 34. It is apparent that a spring clip or other means of biasing the support pin in a vertical position can be employed; thus the term "spring" as used herein is intended to include coil springs, flat metal spring clips and the like.

It is highly preferred that the portion of internal support pin 20 which touches the parison be made of low coefficient of friction, low thermal conductivity material such as polytetrafluoroethylene. Preferably the static coefficient of friction against solid polyethylene, for instance, is less than about 0.5, more preferably less than about 0.25, most preferably less than about 0.1. Preferably the thermal conductivity $k$ value of the material comprising this washer is less than 3.9, more preferably less than 1. By $k$ value is meant the standard $k$ value in $B.t.u./(hr.)(ft.)^2(°F./inch)$. By using such a material the parison slides easily onto and off of the supporting pin and does not stick to washer 36. The support base is preferably made of a similar material to that of the washer so that the parison cover is in contact with no metal while in the heating zone. Contact of the parison preform while in the heating zone with any metal part which stays within the heating zone is undesirable since the metal, being a high thermal conductivity material, would transfer an excessive amount of heat into the parison at the points of contact, thus causing distortion and sticking. As shown in FIGURE 2, a washer 36 of Teflon TFE (Registered Trademark) is affixed to the upper portion of vertically disposed support pin 20 and serves to form the point of contact between the parison and the support pin.

As the endless chain approaches sprocket 38, cam follower 22 on base 17 engages cam sloping surface 39 on the cam plate which is stationary and is carried by the oven by means not shown. As the chain continues its travel around sprocket 38, base 17 is rotated to a vertical plane thus rotating support pin 20 carrying parison 28 to a horizontal position as the cam follower reaches the highest point on cam surface 39. The chain carried by sprockets 44, 46, 48, 50, 52, and 54 in addition to sprocket 38 advances forward in discrete increments, controlled by a conventional indexing mechanism such as a Geneva type, such that it stops with a support base 17 at the transfer station in the position shown in FIGURE 1. The parison is then removed from support pin 20 through aperture 43 in oven 10 and delivered to a molding station (not shown). As the chain moves forward again, cam follower 22 passes the high point on cam plate 42 and support pin 20 is returned to a vertical position through the action of rail 41. As can be seen from FIGURE 1, cam follower 22 is raised to a position between the cam plate and rail 41 by the action of sloping cam surface 39. It is then returned to a horizontal position by the action of rail 41. Since FIGURE 1 is a plan view, the parison support carrying a heated parison which is shown approaching the parison transfer station 14 (position A) and the identical support shown leaving this station (position B) look somewhat similar. However, it can be seen by the position of the shade lines that in the first instance the interior of a cylinder (parison 28) is being viewed and in the second, washer 36 and the base 17 itself are being viewed. This support base, now in the position designated by the character B is ready to receive another parison when it moves under parison loading mechanism 26.

Parison loading mechanism 26 can comprise a clamping mechanism for holding one end of a parison, said clamping mechanism being attached to an air cylinder which pushes the parison downward over the supporting pin at the appropriate time, or it can simply be a hollow cylinder into which the parisons are fed and directed to fall by the force of gravity over one of the vertically disposed supporting pins or a funnel as shown.

To conserve heat, a sliding door or the like can cover the opening to the parison loading station and the aperture 43 during the portion of the cycle where no parison is being loaded or unloaded.

Many standard parts such as temperature controllers, bolts, clamps, and the like, have not been shown for the sake of simplicity but their inclusion is understood by those skilled in the art as is within the scope of the invention.

EXAMPLE

Propylene homopolymer having a density of 0.905 (ASTM D1505–63T), a melt index of 2 (ASTM D1238–62T, Condition L) and a crystalline melting point of 340° F. was extruded into tubing having an internal diameter of 0.8 inch and a wall thickness of 0.15 inch. This tubing was cooled to room temperature and cut into 5 inch lengths. These 5 inch lengths of tubing were positioned over vertically disposed supporting pins having a Teflon washer at the upper end thereof, said pins being carried by an endless chain, and conveyed through an air oven such as is shown in FIGURE 1 in which they were heated to a temperature of 320 to 338° F. The chain contained about 240 support pins and advanced at 6 second intervals to give a total heating time of 24 minutes for each parison. These heated parisons, while at a temperature of 2 to 20 degrees below their crystalline melting point were transferred from a vertical to a horizontal position by a parison transfer mechanism, such as is shown in FIGURES 1 and 2, and received by a blow molding station where they were stretched longitudinally, placed in a mold cavity, and expanded by introduction of internal fluid pressure so as to cause them to conform to the shape of the mold. The resulting biaxially oriented bottles were uniform in appearance indicating that the parison had not been damaged or distorted during the heating or transfer operations.

While this invetnion has been described in detail for the purpose of illustration it is not to be construed as limited thereby but is intended to cover all changes and modifications within the spirit and scope thereof.

What is claimed is:

1. Apparatus for heating a hollow thermoplastic parison comprising:
   (1) an oven;
   (2) an endless chain disposed within said oven;
   (3) a plurality of vertically disposed support pins spaced along said chain and carried by said chain, each of said vertically disposed support pins having a washer at the upper end thereof for contacting the interior of said parison, said washer being composed of a material having a static coefficient of friction of less than 0.25 and a thermal conductivity $k$ value of less than 3.9;
   (4) means for intermittently advancing said chain through said oven;
   (5) means for loading a parison over each of said pins as said pin is advanced to said loading means; and
   (6) means for transferring said parison from a vertical to a horizontal position.

2. Apparatus according to claim 1 wherein said support pins are carried by said chain by means of a support base which is attached through a hinge to said chain, said support base being spring biased so as to maintain said support pins in the vertical position, and wherein said means for transferring said parison from a vertical to a horizontal position comprises a came follower carried by said support base, a stationary cam plate carried by said oven with a cam surface so positioned that as said support base and support pin are moved past said cam plate, said cam follower contacts said cam surface causing said support base and said support pin to rotate about said hinge until said support pin is in a horizontal position.

3. Apparatus according to claim 1 wherein said support base is composed of a material having a static coefficient of friction of less than 0.5 and a thermal conductivity $k$ value of less than 3.9.

4. Apparatus according to claim 1 wherein said washer is made of polytetrafluoroethylene.

5. Apparatus according to claim 4 wherein said support base is composed of a material having a static coefficient of friction of less than 0.5 and a thermal conductivity $k$ value of less than 3.9.

6. A method for providing a temperature conditioned solid thermoplastic parison for a molding station comprising:
   placing said parison into a heating zone;
   holding said parison in a vertical position;
   passing said vertically disposed parison through said heating zone to heat said parison to a temperature of 1 to 50 degrees below the crystalline melt point of the material comprising said thermoplastic parison; and
   rotating said vertically disposed parison 90° so as to transfer said parison to a horizontal position.

7. The method according to claim 6 wherein the material comprising said thermoplastic parison is a polymer of a 1-olefin selected from the group consisting of ethylene, propylene, butene, and mixtures thereof.

8. The method according to claim 6 wherein said thermoplastic material is polypropylene.

9. A method according to claim 6 wherein said parison is held in a vertical position by means of a support base and an internal support and wherein said supports at all points of contact with said parison are composed of a material having a static coefficient of friction of less than 0.5 and a thermal conductivity $k$ value of less than 3.9.

References Cited

UNITED STATES PATENTS

| | | | |
|---|---|---|---|
| 2,848,213 | 8/1958 | Bloom et al. | 263—8 X |
| 3,186,028 | 6/1965 | Dobbins et al | 263—8 X |
| 3,283,046 | 11/1966 | De Witt et al. | |

JOHN J. CAMBY, Primary Examiner

U.S. Cl. X.R.

18—5